(12) United States Patent
Ishizaki

(10) Patent No.: US 7,727,416 B2
(45) Date of Patent: *Jun. 1, 2010

(54) OPTICAL DEVICE, METHOD OF FABRICATING THE SAME, AND LIQUID CRYSTAL DISPLAY

(75) Inventor: Koji Ishizaki, Tokyo (JP)

(73) Assignee: Sony Corporation, Tokyo (JP)

( * ) Notice: Subject to any disclaimer, the term of this patent is extended or adjusted under 35 U.S.C. 154(b) by 237 days.

This patent is subject to a terminal disclaimer.

(21) Appl. No.: 11/768,498

(22) Filed: Jun. 26, 2007

(65) Prior Publication Data

US 2008/0113115 A1 May 15, 2008

(30) Foreign Application Priority Data

Jun. 30, 2006 (JP) ............................. 2006-181715

(51) Int. Cl.
*G09K 19/00* (2006.01)
*G09K 19/06* (2006.01)
*G09K 19/52* (2006.01)

(52) U.S. Cl. .............................. 252/299.01; 252/299.6; 430/20; 430/270.1; 428/1.1; 349/117

(58) Field of Classification Search .................. 430/20, 430/270.1; 428/1.1; 252/299.01, 299.6; 349/117

See application file for complete search history.

(56) References Cited

U.S. PATENT DOCUMENTS

2008/0180608 A1 * 7/2008 Ishizaki ...................... 349/106

FOREIGN PATENT DOCUMENTS

| JP | 2004-029202 | 1/2004 |
|----|-------------|--------|
| JP | 2004-258623 | 9/2004 |
| JP | 2005-010740 | 1/2005 |
| JP | 2005-062671 | 3/2005 |
| JP | 2005-227425 | 8/2005 |
| JP | 2005-272560 | 10/2005 |

OTHER PUBLICATIONS

Japanese Office Action dated May 1, 2008 for Application No. 2006-181715.

* cited by examiner

*Primary Examiner*—Geraldina Visconti
(74) *Attorney, Agent, or Firm*—Sonnenschein Nath & Rosenthal LLP

(57) ABSTRACT

An optical device is disclosed. The optical device includes: a polymerizable liquid crystal monomer hybrid-aligned in the optical device; and a first polymerizable liquid crystal monomer aligned at a given angle to an alignment processed surface; and a second polymerizable liquid crystal monomer hybrid-aligned relative to the alignment processed surface; wherein viewing-angle dependence of a phase difference of the optical device is controlled by a ratio of the amount of the first polymerizable liquid crystal monomer to the amount of the second polymerizable liquid crystal monomer.

15 Claims, 6 Drawing Sheets

OPTICAL DEVICE, METHOD OF FABRICATING THE SAME, AND LIQUID CRYSTAL DISPLAY

CROSS REFERENCES TO RELATED APPLICATIONS

The present invention contains subject matter related to Japanese Patent Application JP2006-181715 filed in the Japanese Patent Office on Jun. 30, 2006, the entire contents of which being incorporated herein by reference.

BACKGROUND OF THE INVENTION

1. Field of the Invention

The present invention relates to an optical device for aligning liquid crystal molecules at an angle and to a method of fabricating this optical device. The invention also relates to a liquid crystal display using this optical device.

2. Description of the Related Art

Known optical devices incorporated in liquid crystal displays are optical devices made of polymerizable liquid crystal materials. These elements are widely used in absorptive circularly polarizing plates (λ/4 retardation layer and λ/2 retardation layer) forming liquid crystal displays. Furthermore, they are widely used as linearly polarizing plates and as viewing angle-compensating layers of various liquid crystal modes.

For example, it is known that in an ECB mode liquid crystal display, a wide viewing angle is obtained by aligning liquid crystal molecules at an angle to form an optical device of a so-called hybrid structure as a retardation layer. That is, the phase difference of the optical device (retardation layer) in which the liquid crystal molecules are aligned at an angle has dependence on the viewing angle. Therefore, a wide viewing angle can be secured by combining optical devices (retardation layers) of a hybrid structure of a phase difference having given dependence on the viewing angle so as to cancel out the residual phase difference of the liquid crystal layer LC when black is exhibited by the ECB mode liquid crystal cell and constructing a liquid crystal display.

Such a retardation layer (optical device) is formed by applying compositions including a polymerizable liquid crystal compound or surface active agent onto a substrate and then polymerizing the polymerizable liquid crystal compound by light irradiation or heating. Furthermore, a polymerizable liquid crystal compound has been proposed which has compositions whose viscosities are kept high to permit the compositions to be applied over a large area uniformly and easily. This compound does not easily crystallize if allowed to stand at room temperature (see JP-A-2005-272560 (patent document 1)).

SUMMARY OF THE INVENTION

However, when the retardation layer (optical device) of the above-described hybrid structure is formed, the viewing-angle dependence of the phase difference is controlled by appropriately selecting materials such as polymerizable liquid crystal compounds forming the retardation layer. Therefore, it is difficult to obtain desired viewing angle-dependence.

Furthermore, in recent years, a method of thinning a device by forming the above-described retardation layer to be placed inside liquid crystal cell has been proposed. In order to realize this structure in which the retardation layer is placed inside the cell, the retardation layer needs some degree of heat resistance. Therefore, if the method of controlling the viewing-angle dependence of the phase difference of the retardation layer by selection of materials as described previously is adopted, materials having better heat resistance may be required to be selected. This has made it more difficult to obtain a retardation layer of the hybrid structure having desired viewing-angle dependence.

Accordingly, it is desirable to provide an optical device of a hybrid structure capable of controlling the viewing-angle dependence of the phase difference without relying only on selection of materials. It is also desirable to provide a method of fabricating this optical device. Furthermore, it is desirable to provide a liquid crystal display in which an optical device (retardation layer) of the hybrid structure whose phase difference has desired viewing-angle dependence is placed inside liquid crystal cells.

An optical device according to one embodiment of the present invention achieves one of these requirements and uses hybrid-aligned polymerizable liquid crystal monomers including first and second monomers. The first monomer is aligned at a given angle to the alignment processed surface. The second monomer is hybrid-aligned with respect to the alignment processed surface. The viewing-angle dependence of the phase difference is controlled by the ratio of the amount of the contained second polymerizable liquid crystal monomer to the amount of the contained first polymerizable liquid crystal monomer.

Another embodiment of the present invention provides a method of fabricating such an optical device. A further embodiment of the invention provides a liquid crystal display having a retardation layer made of this optical device.

In this optical device, the viewing-angle dependence of the phase difference can be controlled by adjusting the ratio of the amount of the contained second polymerizable liquid crystal monomer to the amount of the contained first polymerizable liquid crystal monomer according to the alignment of the first and second monomers. Consequently, the viewing-angle dependence of the phase difference in the optical device where the polymerizable liquid crystal monomers are hybrid-aligned is controlled without depending on only material selection.

As described so far, according to the present invention, the viewing-angle dependence of the phase difference can be controlled without depending on only material selection. Consequently, materials can be selected from a wider range of choices in fabricating the optical device. The heat resistance of the optical device having a desired phase difference can be improved. In consequence, an optical device in which polymerizable liquid crystal monomers are hybrid-aligned can be formed as a retardation layer inside liquid crystal cells which are required to have heat resistance.

DESCRIPTION OF THE PREFERRED EMBODIMENTS

Embodiments of the present invention are hereinafter described.

<Optical Device>

Figure 1:
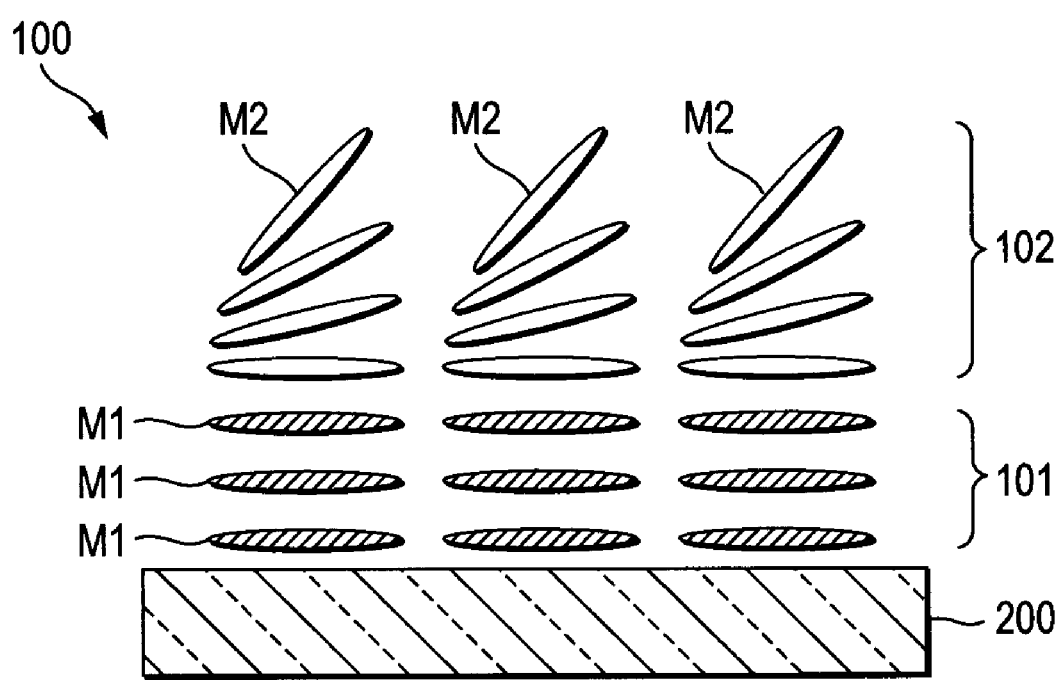
FIG. 1 is a diagram of an optical device according to one embodiment of the present invention, illustrating the structure of the optical device.

FIG. 1 is a schematic representation showing the structure of an optical device using polymerizable liquid crystal compositions as described above. As shown in this figure, an optical device 100 is formed on an alignment substrate 200 whose surface has been alignment processed. For example, the alignment substrate 200 is a glass substrate whose surface is coated with an alignment film underdone alignment processing (e.g., rubbing). Another example is a substrate with alignment ability.

Usually, polyimide, polyamide, and polyvinyl alcohols are used as the alignment film. The rubbing is normally carried out by selecting rubbing cloth from various materials including rayon, cotton, polyamide, and polymethyl methacrylate, winding the cloth around a metal roll, and rotating the roll while keeping it in contact with film or conveying the film while maintaining the roll at rest to rub the film surface.

The optical device 100 includes a first layer 101 formed on the alignment processed surface (hereinafter referred to as the substrate surface) of the alignment substrate 200 and a second layer 102 on top of the first layer.

Of these layers, in the first layer 101, a first polymerizable liquid crystal monomer M1 is cross-linked in three dimensions while aligned at a given angle to the substrate surface. In the first layer 101, the angle (pretilt angle) made between the longer axis of the first polymerizable liquid crystal monomer M1 and the substrate surface of the alignment substrate 200 is constant in the direction of thickness of the film. The longer axis of the first monomer M1 is aligned along the direction of alignment of the alignment substrate 200. In the illustrated state, the first polymerizable liquid crystal monomer M1 is homogeneously aligned in a parallel relation to the substrate surface. However, the alignment of the first monomer M1 is not limited to homogeneous alignment. It may be only required that the first polymerizable liquid crystal monomer M1 located in the direction of thickness of the film be at a given angle to the substrate surface except where the angle is a right angle (90°). For example, the alignment can be tilt alignment in which the monomer is aligned at a given angle to the substrate surface. The angle of the first polymerizable liquid crystal monomer M1 to the substrate surface can be controlled by aligning the substrate surface of the alignment substrate 1.

Materials which are aligned at a given angle to the alignment processed surface can be used as the first polymerizable liquid crystal monomer M1 used in the above-described first layer 101. Preferably, materials having high heat resistance are selected from those materials. One specific desirable example of the first monomer M1 is a compound represented by the following structural formula (1).

Structural Formula (1)

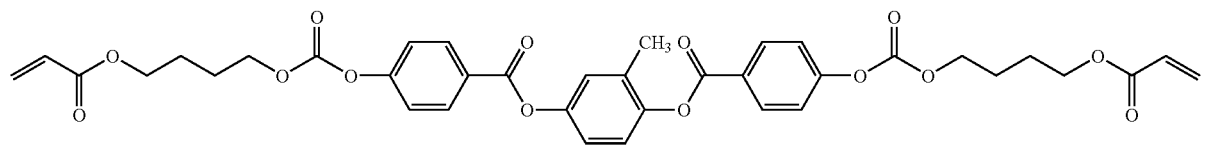

Other examples of the first polymerizable liquid crystal monomer M1 are LC270 and LC1057 produced by BASF Corporation.

In the second layer 102, the second polymerizable liquid crystal monomer M2 is three-dimensionally cross-linked and fixed while hybrid-aligned. Within the second layer 102, the longer axis of the second monomer M2 becomes more parallel to the surface of the first layer 101 with approaching the first layer 101. On the other hand, the angle (pretilt angle) made between the longer axis of the second monomer M2 and the surface of the alignment substrate 200 increases with going away upwardly from the first layer 101. It is assumed that the longer axis of the second monomer M2 is aligned along the longer axis of the first monomer M1 forming the first layer 101.

The second polymerizable liquid crystal monomer M2 used in the second layer 102 is hybrid-aligned with respect to the alignment processed surface. A compound having at least two polymerizable functional groups is used. An example of the second polymerizable liquid crystal monomer M2 is a compound represented by the following general formula (1).

General Formula (1)

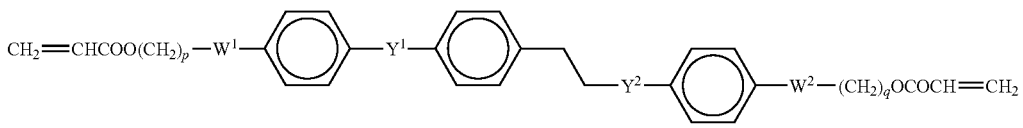

wherein $W^1$ and $W^2$ independently indicate single bonds, —O—, —COO—, or —OCO—, $Y^1$ and $Y^2$ independently indicate —COO— or —OCO—, p and q independently indicate integers of 2 to 18, and at least one hydrogen atom of each of three kinds of 1,4-phenylene groups present within the formula may be replaced by alkyl group, alkoxyl group or alkanoyl group having 1 to 7 carbon atoms, cyano group or halogen atom.

In order that crystals may not be easily deposited at room temperature, two or more compounds represented by general formula (1) are included. Preferably, three or more compounds are included.

To secure sufficient heat resistance and hinder deposition of crystal at room temperature, the polymerizable liquid crystal monomer represented by general formula (1) preferably contains more than 60% by mass, more preferably more than 65% by mass, still preferably more than 70% by mass.

The alignment of the polymerizable liquid crystal monomers can be improved by using nematic liquid crystals represented by the following general formulas (2)-1 to (2)-4, together with polymerizable liquid crystal monomers represented by this general formula (1). Two or more nematic liquid crystals represented by these general formulas (2)-1 to (2)-4 may be used.

General Formula (3)

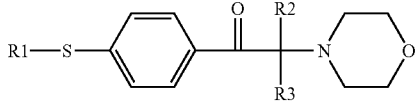

General Formula (4)

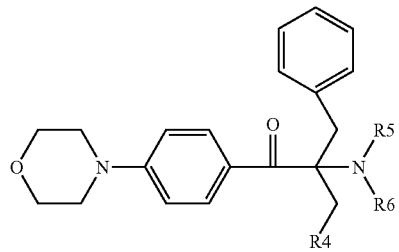

Each of R1 to R6 included in general formulas (3) and (4) independently represents a hydrogen atom or methyl group.

General Formula (2)-1

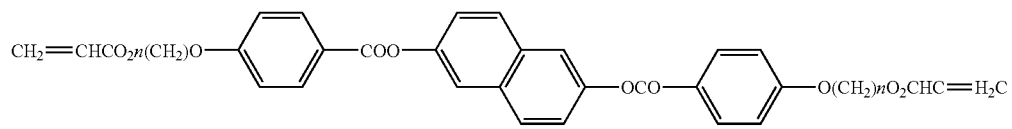

General Formula (2)-2

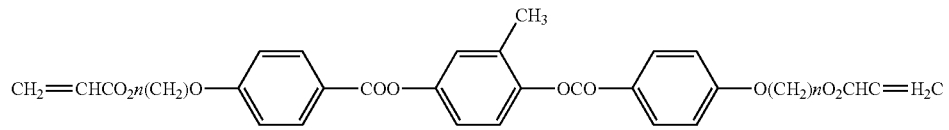

General Formula (2)-3

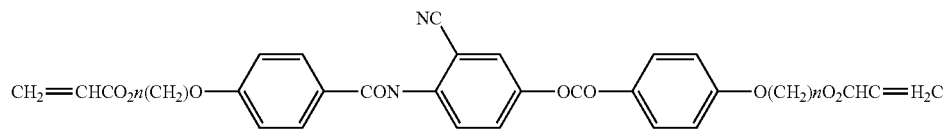

General Formula (2)-4

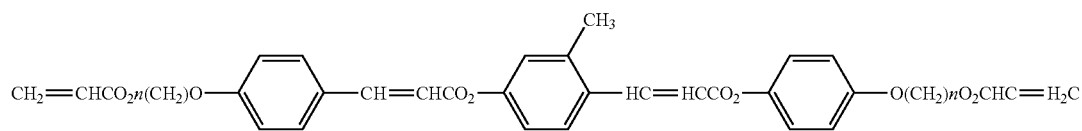

wherein each n included in general formulas (2)-1 to (2)-4 is an integer of from 2 to 10.

It is assumed that the first layer 101 and second layer 102 contain a photopolymerization initiator and a surface active agent, in addition to the polymerizable liquid crystal monomers M1 and M2.

A compound represented, for example, by the following general formula (3) or (4) is preferably used as the photopolymerization initiator. One specific example is Irgacure907 which is produced by Ciba Specialty Chemicals and which is represented by general formula (3). Another specific example is Irgacure369 produced by Ciba Specialty Chemicals and which is represented by general formula (4).

Plural kinds of photopolymerization initiators may be combined and used according to the need. Furthermore, a further photopolymerization initiator may be added. Generally, the amount of added photopolymerization initiators is 0.01-15% by weight, preferably 0.1-12% by weight, more preferably 0.5-10% by weight.

Megafac F-08 produced by Dainippon ink and chemicals, incorporated, BYK361 produced by BYK-Chemie GmbH, Polyflow461 produced by Kyoeisha Chemical Co., Ltd., or other material can be used as the surface active agent. Besides, fluorine-based surface active agent or acrylic surface active agent can be used. DMAOP produced by AZmax Corporation can be used as the fluorine-based surface active agent. BYK361 produced by BYK-Chemie GmbH or Polyflow461 produced by Kyoeisha Chemical Co., Ltd., can be used as the acrylic surface active agent. These surface active agents may be used alone or in combination.

An appropriate amount of surface active agent can be added as long as the alignment of the molecules of the liquid crystal material is not hindered. Generally, the ratio of the agent to the liquid crystal material is preferably about 0.001 to 10% by weight, more preferably about 0.01 to 5% by weight.

The surface active agent controls the tilt angles of the polymerizable liquid crystal monomers in the optical device using the polymerizable liquid crystal compositions. An optical device in which polymerizable liquid crystal monomers are hybrid-aligned at a uniform tilt angle within a plane can be fabricated.

In the optical device 100 where the first layer 101 and second layer 102 described above are stacked on top of each other, the ratios of the amount of the first polymerizable liquid crystal monomer M1 and of the amount of the second polymerizable liquid crystal monomer M2 to the whole optical device 100 are adjusted by the rate of content of the amount of the first monomer M1 in the first layer 101, the film thickness t1, the rate of content of the amount of the second monomer M2 in the second layer 102, and the film thickness t2. Consequently, the viewing-angle dependence of the phase difference is controlled.

It is assumed that the composition ratios of the polymerizable liquid crystal monomers M1 and M2 in the first layer 101 and second layer 102, respectively, are set to constant values, taking account of the heat resistance of the optical device 100 and the easiness of the manufacturing process, for example. In this case, the center value of the phase difference in the front direction of the viewing angle is set to a given value according to the film thickness (t1+t2) of the whole optical device 100. The amount of variation of the phase difference in the direction of the viewing angle is controlled to a given value by the ratio of the film thickness t2 to the film thickness t1.

In the optical device 100 constructed in this way, the viewing-angle dependence of the phase difference is controlled without depending on only selection of materials including polymerizable liquid crystal monomers and other compounds. This can provide more latitude in selecting polymerizable liquid crystal monomers and other compounds constituting the optical device 100.

Therefore, the optical device 100 having desired viewing-angle dependence (phase difference) can be fabricated using, for example, materials which have high heat resistance but produce excessively large or small variations in the phase difference in the direction of the viewing angle. The heat-proofness of the optical device 100 can be improved.

In the description of the embodiment provided so far, the ratio of the amount of the second polymerizable liquid crystal monomer M2 to the amount of the first polymerizable liquid crystal monomer M1 contained in the optical device 100 made of the laminated structure of the first layer 101 and the second layer 102 is adjusted by the film thickness t1 of the first layer 101 and the film thickness t2 of the second layer 102. However, the optical device according to an embodiment of the present invention may be so designed that the viewing-angle dependence of the phase difference is controlled by the ratio of the amount of the second monomer M2 to the amount of the first monomer M1. Accordingly, the optical device may be a monolayer structure containing both first polymerizable liquid crystal monomer M1 and second polymerizable liquid crystal monomer M2.

In the optical device of this monolayer structure, the first polymerizable liquid crystal monomer M1 is hybrid-aligned by the effect of the state of alignment of the second polymerizable liquid crystal monomer M2. On the other hand, the second monomer M2 is aligned at lower tilt angles as a whole by the effect of the homogeneous alignment of the first monomer M1.

As the amount of the contained first polymerizable liquid crystal monomer M1 aligned at a given angle increases, the amounts of variations of the tilt angles of the first monomer M1 and second monomer M2 in the direction of film thickness decrease. The amounts of variations in the phase difference in the direction of the viewing angle decrease. Therefore, the ratio of the amount of the first monomer M1 to the amount of the second monomer M2 is adjusted such that the phase difference produces desired viewing-angle dependence.

Where the first polymerizable liquid crystal monomer M1 alone exhibits tilt alignment, the second polymerizable liquid crystal monomer M2 is aligned, as a whole, at higher tilt angles by the effect of the tilt alignment of the first monomer M1. Consequently, as the amount of the contained first monomer M1 is increased, the amount of variation in the phase difference in the direction of the viewing angle increases. Taking account of this, the ratio of the amount of the first monomer M1 to the amount of the second monomer M2 is adjusted.

In the laminate structure described in connection with FIG. 1, the viewing-angle dependence of the phase difference in the second layer 102 may be adjusted by adding a given amount of the first monomer M1 to the second layer 102. Furthermore, the laminate structure may be so designed that the viewing-angle dependence of the phase difference is adjusted by the film thickness of the first layer 101.

<Method of Fabricating Optical Device>

A method of fabricating the optical device 100 shown in FIG. 1 is next described.

The aforementioned given percentages of the materials (i.e., (a) the first polymerizable liquid crystal monomer M1, (b) photopolymerization initiator, and (c) surface active agent) of the first layer 101 are first dissolved in a solvent. The obtained liquid to be applied is adjusted. The liquid is applied on the alignment substrate 200 to a given film thickness, forming a film. Any of various methods of coating can be used to form the film.

Then, the solvent in the film on the alignment substrate 200 is dried. Subsequently, the film is aligned at a temperature that is equal to the temperature at the boundary between the liquid crystal phase and the isotropic phase plus 10° C., and then the film is irradiated with radiation. Consequently, the first monomer M1 (a) is cross-linked in three dimensions.

At this time, the film is irradiated with the radiation preferably within an ambient of an inert gas such as nitrogen ($N_2$). In consequence, the heat-resistant optical device 100 can be fabricated without suffering from oxygen inhibition.

A mercury excitation light source (such as a low-pressure mercury lamp, high-pressure mercury lamp, or ultrahigh pressure mercury lamp) or a xenon light source can be used as the source of the radiation emitted to the film. It is desirable to select a light source having an optical intensity peak lying in the wavelength range to which the photopolymerization initiator sensitively responds.

It is assumed that the film is irradiated with the radiation at a temperature that is higher than room temperature but lower than the transparent points (N-I points) of the liquid crystal-line monomers. Consequently, a heat-resistant optical device 100 having a high cross-linking density can be fabricated without spoiling the mesomorphism (anisotropy). A transparent point is the phase transition temperature between liquid crystal phase and liquid phase.

When the first layer 101 described above is formed, the film thickness t1 can be adjusted by the concentration of the solid content within the solution, spin coating rate, rotation time, or other parameter, for example, in the case of spin coating although the adjustment depends on the method of applying the materials. In the case of extrusion application such as slit coating or die coating, the film thickness t1 is controlled by adjusting the solid content within the solution, the relative speed between the slit head or die head and the substrate to which the materials are applied, the amount of the applied materials, or other parameter.

Then, the aforementioned given percentages of the materials (i.e., the second polymerizable liquid crystal monomer M2 (a), photopolymerization initiator (b), and surface active agent (c)) of the second layer 102 are dissolved in a solvent. The obtained liquid to be applied is adjusted. The liquid is then applied to a given film thickness onto the first layer 101, forming a film. Any of various methods of coating can be used to form the film.

Then, the film is dried by heating. The second polymerizable liquid crystal monomer M2 within the film is hybrid-aligned. Thus, the molecules of the second liquid crystal monomer are hybrid-aligned without interposing the film between substrates having different directions of alignment and processing the film. At this time, the first layer 101 acts as an alignment film. The direction of alignment of the second monomer M2 is aligned to the direction of alignment of the first monomer M1 forming the first layer 101. The phase difference of the optical device 100 is controlled by adjusting the tilt angle of the second monomer M2 by the heating temperature.

Then, this is placed in a room-temperature environment and irradiated with radiation in the same way as when the first layer 101 is formed, thus cross-linking the second polymerizable liquid crystal monomer M2 (a) in three dimensions.

When the second layer 102 is formed as described so far, the film thickness t2 is controlled in the same way as when the first layer 101 is formed.

After forming the first layer 101 and second layer 102 in which the polymerizable liquid crystal monomers M1 and M2 are respectively cross-linked in three dimensions as described above, the three-dimensional cross-linking is promoted further by performing a thermal treatment. In this embodiment, the thermal treatment is performed at a temperature higher than the transparent points (N-I points) of the liquid crystal monomers. As a result, a tilt-aligned retardation film having improved heat resistance can be obtained. The thermal treatment is performed above 100° C. and below 230° C. for 10 to 120 minutes though the temperature depends on the materials and heat treatment conditions in process steps carried out after the step for forming the retardation film. Consequently, the obtained optical device 100 is prevented from being turned yellow during subsequent thermal processing or suffering from deteriorations such as a decrease in the amount of the phase difference.

As a result of the fabrication method described so far, the optical device is obtained in which the polymerizable liquid crystal monomers are hybrid-aligned by the use of a photopolymerization initiator represented by general formula (3) or (4). However, it has been confirmed that the heat resistance is improved as shown in embodiments given below.

Even where the optical device 100 is treated by a subsequent heating step, the characteristics of the optical device 100 are not varied before and after the heating step. Rather, the characteristics can be held stably. For example, the phase difference in the front direction and the phase difference from a direction tilted in the direction of the polar angle can be held stably without variations before and after the heating step.

<Liquid Crystal Display 1>

Figure 2:
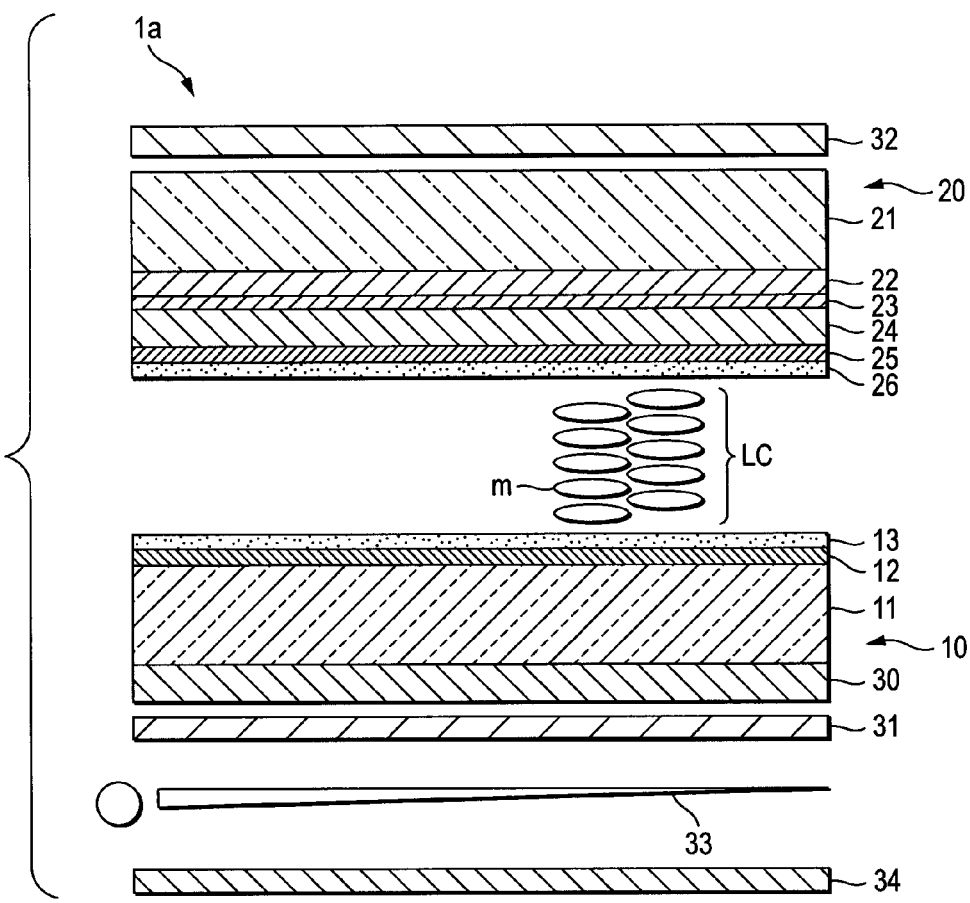
FIG. 2 is a cross-sectional view of a first example of a liquid crystal display according to an embodiment of the present invention.

FIG. 2 is a cross-sectional view of a first example of a liquid crystal display according to an embodiment of the present invention, showing the structure. The illustrated liquid crystal display 1a is a transmissive liquid crystal display 1a operated in ECB mode. The display 1a has the aforementioned optical device as a retardation layer (hereinafter referred to as the hybrid retardation layer) in which molecules of a liquid crystal material are hybrid-aligned. The liquid crystal display 1a is constructed as described below.

That is, the liquid crystal display 1a is operated in an ECB display mode in which the alignment axis of the liquid crystal material on the observer's side and the alignment axis of the liquid crystal material on the light source side are substantially equal when no voltage is applied. The liquid crystal display 1a has a TFT substrate 10, a counter substrate 20 disposed opposite to the surface of the TFT substrate 10 on which devices are fabricated, and a layer LC of a liquid crystal material sandwiched between the TFT substrate 10 and the counter substrate 20. A λ/4 retardation film (phase difference plate) 30 is placed in intimate contact with the outer surface of the TFT substrate 10. Polarization plates 31 and 32 are in intimate contact with the outer surfaces of the TFT substrate 10 and counter substrate 20 in a crossed Nicols arrangement. A backlight 33 and a reflective plate 34 are disposed outside the polarization plate 31 that is arranged on a side of the TFT substrate 10.

A driver electrode layer 12 is formed on the surface of the TFT substrate 10 which is opposite to the liquid crystal layer LC on a transparent substrate 11 such as a glass substrate. Driver elements such as TFTs (thin-film transistors) and pixel electrodes connected with the TFTs are fabricated on pixels on the driver electrode layer 12. An alignment film 13 is formed to coat the driver electrode layer 12. For example, the alignment film 13 has been rubbed or otherwise aligned in a given direction with respect to the transmissive axis of the polarization plate 31 on the TFT substrate 10.

In the counter substrate 20, on the other hand, color filters 22 for R (red), G (green), and B (blue), respectively, an alignment film 23, a hybrid retardation film 24, a counter electrode 25, and an alignment film 26 are arranged in this order over the surface of the transparent substrate 21 such as a glass substrate which faces the liquid crystal layer LC. Another alignment film (not shown) is formed over the counter electrode 25. This alignment film has been rubbed or otherwise alignment in an antiparallel relationship to the alignment film formed on the TFT substrate 10.

In one feature of the present invention, the optical device 100 of the laminate structure already described in connection with FIG. 1 is used as the hybrid retardation film 24 in which the molecules of a liquid crystal material have been hybrid-aligned. That is, given viewing-angle dependence is imparted to the phase difference of the hybrid retardation film 24 by adjusting the ratio of the amounts of two kinds of polymerizable liquid crystal monomers as described previously in connection with FIG. 1 such that the residual phase difference of the liquid crystal layer LC is canceled out over a wide viewing angle when black is exhibited.

The transparent substrate 21 on which the alignment film 23 is formed corresponds to the alignment substrate already described in connection with FIG. 1. Therefore, the second polymerizable liquid crystal monomer M2 which is present within the hybrid retardation film 24 and which is hybrid-aligned is flush with the surface of the transparent substrate 21. The monomer M2 is so aligned that it gradually rises toward the vertical direction in approaching the liquid crystal layer LC. The hybrid retardation film 24 may use an optical device of a monolayer structure in which the above-described first and second polymerizable liquid crystal monomer M1 and M2 are mixed at a given composition ratio, instead of the laminate-structure optical device 100 already described in connection with FIG. 1.

The direction of alignment of the hybrid retardation film 24 is so set as to substantially cancel out the phase difference of the phase-difference plate ($\lambda/4$ retardation film 30) and the residual phase difference of the liquid crystal layer LC when black is exhibited by applying voltages to the counter electrode 25 and pixel electrodes.

In the liquid crystal display 1a of the structure described above, the hybrid retardation film 24 is formed as a layer over the transparent substrate 21 via the color filters 22, forming an inner cell.

In the liquid crystal display 1a of the structure described so far, the optical device 100 of the structure already described in connection with FIG. 1 is incorporated as the hybrid retardation film 24 in the ECB mode liquid crystal display 1a. Thus, the residual phase difference of the liquid crystal layer LC is canceled out when black is exhibited. Hence, a wide viewing angle can be obtained.

Especially, because of the structure in which the tilt angle of the molecules of the liquid crystal material is varied in the direction of the film thickness, the hybrid retardation film 24 that would tend to vary in phase difference due to heating is fabricated from the optical device to which sufficient heat resistance is imparted by improving the latitude in selecting the materials as described previously. Consequently, sufficient heat resistance can be exhibited if the retardation layer is formed inside the liquid crystal cell, and desired phase difference can be maintained.

As a result, the alignment of the hybrid retardation film 24 of the ECB mode liquid crystal display 1a having the hybrid retardation film 24 and of an electronic device using the liquid crystal display 1a can be improved. A high contrast display can be provided in spite of good viewing angle.

Because the hybrid retardation film 24 is formed on top of the color filters 22, the retardation film 24 acts also as a protective layer for the color filters 22. Consequently, degassing from the filters 22 can be prevented.

<Liquid Crystal Display-2>

Figure 3:
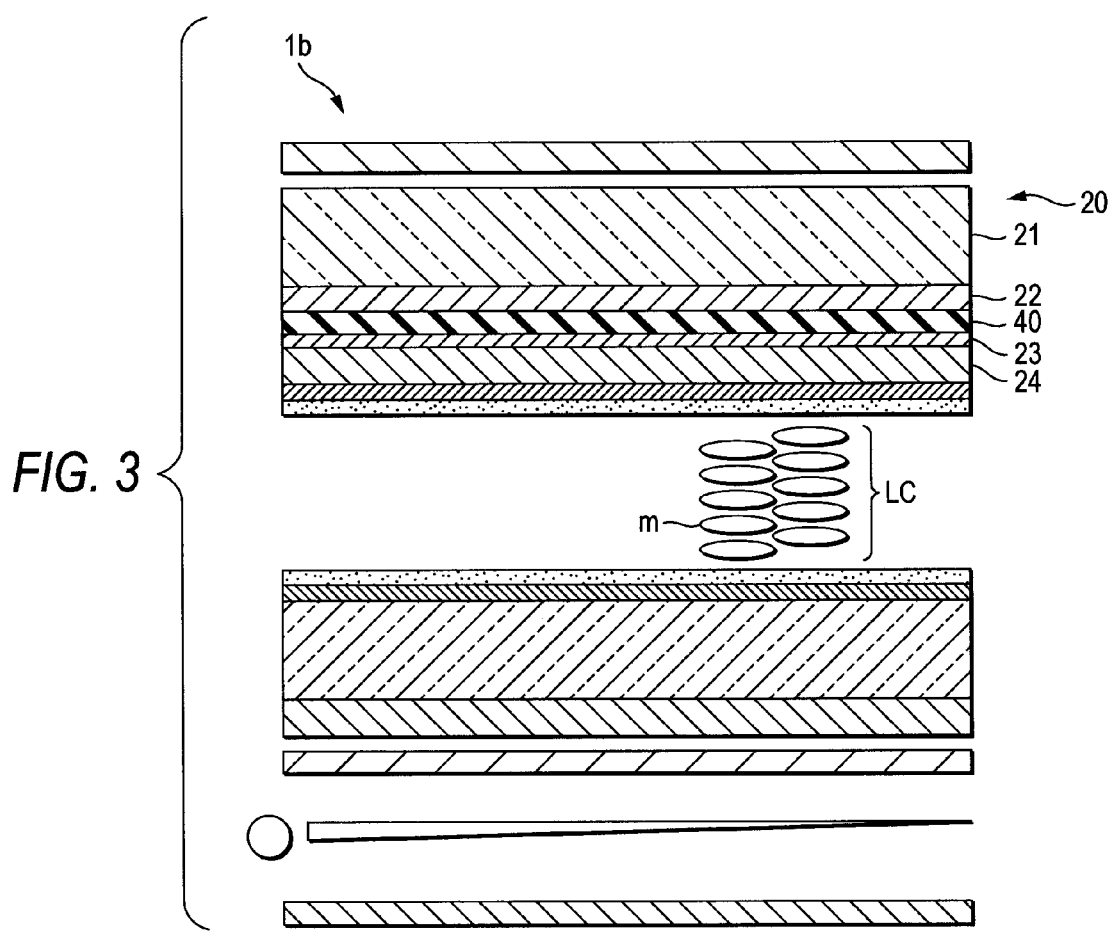
FIG. 3 is a cross-sectional view of a second example of the liquid crystal display according to the embodiment of the present invention.

FIG. 3 is a cross-sectional view of a second example of a liquid crystal display according to the embodiment of the present invention, showing the structure. The illustrated liquid crystal display, indicated by 1b, is similar in configuration to the liquid crystal display 1a shown in FIG. 2 except for the structure of the counter substrate 20. That is, in the liquid crystal display 1b, the color filters 22 on the transparent substrate 21 are coated with a flattened dielectric film 40. The alignment film 23 and hybrid alignment film 24 are formed over the flattened dielectric film 40.

By forming the flattened dielectric film 40 in this way, the hybrid alignment film 24 can be formed on a flat base surface. Consequently, the alignment of the hybrid retardation film 24 can be improved.

<Liquid Crystal Display-3>

Figure 4:
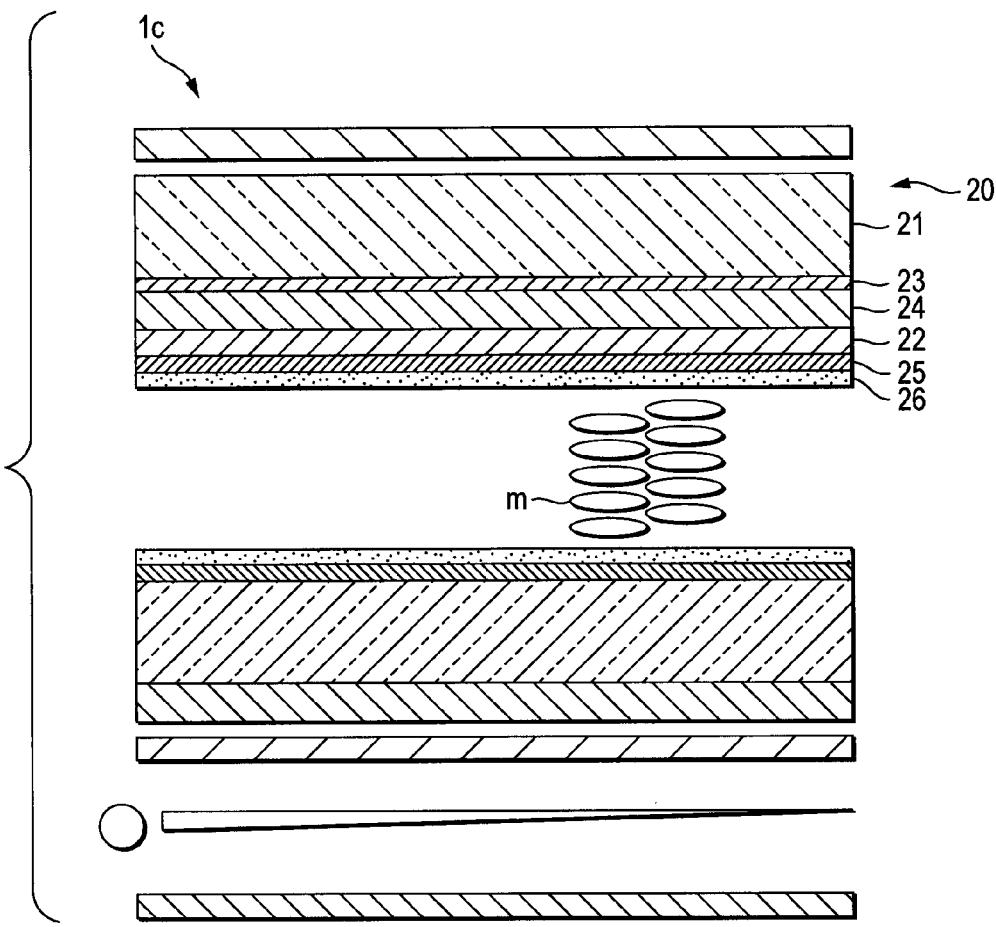
FIG. 4 is a cross-sectional view of a third example of the liquid crystal display according to the embodiment of the present invention.

FIG. 4 is a cross-sectional view of a third example of the liquid crystal display according to the embodiment of the present invention, showing the structure. The illustrated liquid crystal display, indicated by 1c, is similar in configuration with the liquid crystal display 1a shown in FIG. 2 except for the structure of the counter substrate 20. That is, in the liquid crystal display 1c, the alignment film 23 and hybrid alignment film 24 are formed directly on the transparent substrate 21.

In this structure, the base layer on which the hybrid retardation film 24 is formed is made flatter. In consequence, the alignment of the hybrid retardation film 24 can be improved further.

In the description of the first through third examples provided so far, ECB mode liquid crystal displays are shown, each of the displays having the hybrid retardation film 24 as a viewing angle-compensating layer. It is to be noted, however, the present invention can also be applied to a TN mode liquid crystal display in which the hybrid retardation film 24 is formed inside the cell. In this case, the optical structures such as polarization plates disposed inside and outside liquid crystal cells as described in the above examples may be appropriately modified to conform with display and operation in TN mode. The hybrid retardation film 24 may be formed at the same position as in the above examples. The same advantages can be obtained as in the above examples.

Furthermore, in the description of the above examples, the present invention is applied to transmissive liquid crystal displays. However, liquid crystal displays according to embodiments of the present invention can also be applied to semitransmissive, semi-reflective liquid crystal displays. In this case, during a process sequence for forming the hybrid retardation film 24 by the aforementioned method of fabricating an optical device, when the film of polymerizable liquid crystal compositions is irradiated with radiation, transmissive display portions and reflective display portions are discriminated as radiation-exposed portions and unexposed portions by the use of a mask having radiation-transmitting regions and radiation-blocking or -reflecting portions. Desired phase difference is obtained by cross-linking polymerizable liquid crystal monomers in three dimensions in the exposed portions. In the unexposed portions, the phase difference is set to 0 or a given low value without cross-linking the polymerizable liquid crystal monomers in three dimensions.

In the description of the above examples, the $\lambda/4$ retardation film 30 is placed outside the liquid crystal cell. However, this $\lambda/4$ retardation film 30 may also be placed inside the cell.

In this case, the $\lambda/4$ retardation film 30 is placed, for example, in the lower layer side of the hybrid retardation film 24 as an example. In this structure, the $\lambda/4$ retardation film 30 may be formed using polymerizable liquid crystal materials by the same technique as the technique used to form the hybrid retardation film. Using this surface as an alignment surface, the hybrid retardation film 24 may be formed directly on the alignment surface. Furthermore, an alignment film may be formed over the $\lambda/4$ retardation film 30, and the hybrid retardation film 24 may be formed on the alignment film.

In this case, the $\lambda/4$ retardation film 30 placed inside the cell may not need to have a hybrid structure and, therefore, heat resistance can be more easily obtained than the hybrid retardation film 24. Even where this $\lambda/4$ retardation film 30 is used, it is important that a heat-resistant material be selected to form the retardation film.

In addition, the invention can also be applied to a liquid crystal display in which the hybrid retardation film 24 is not placed inside the cell. The heat resistance of the hybrid retardation film 24 can be improved. This will result in advantages.

EXAMPLES

Examples 1 and 2

The optical device 100 of the laminate structure shown in FIG. 1 was fabricated in the manner described below.

Adjustment of composition A: the following materials (a)-(d) were mixed as the composition A for forming the first layer 101.

(a) First polymerizable liquid crystal monomer M1: 20 parts by weight of a compound represented by structural formula (1)

(b) Photopolymerization initiator: 1 part by weight of Irgacure907 which is produced by Ciba Specialty Chemicals and which is represented by general formula (3)

(c) Surface active agent: 0.02 part by weight of Megafac F-08 produced by Dainippon ink and chemicals, incorporated (d) Solvent: 78.98 parts by weight of propylene glycol methyl ethyl ether (PGMEA)

nitrogen having an oxygen content of less than 0.1, the film was exposed with an ultrahigh-pressure vacuum mercury lamp at an illumination of 30 mW/cm² for an exposure time of 20 seconds to cross-link the homogeneously aligned first polymerizable liquid crystal monomer M1 in three dimensions, forming the first layer 101.

When the first layer 101 was formed in this way, the first layer 101 having a film thickness of 0.3 μm was formed in Example 1 by adjusting the rotational speed of spin-coating. In Example 2, the first layer 101 having a film thickness of 0.6 μm was formed.

Then, the composition B was directly spin-coated onto the first layer 101 to form a film. Subsequently, the solvent was removed by drying under a reduced pressure at a final degree of vacuum of 0.4 Torr. Then, the film was heated on a hot plate at 60° C. for 1 minute to align the molecules of the liquid crystal material. Thereafter, within an ambient of nitrogen having an oxygen content of less than 0.1, the film was exposed with an ultrahigh-pressure vacuum mercury lamp at an illumination of 30 mW/cm² for an exposure time of 20

Structural Formula (1)

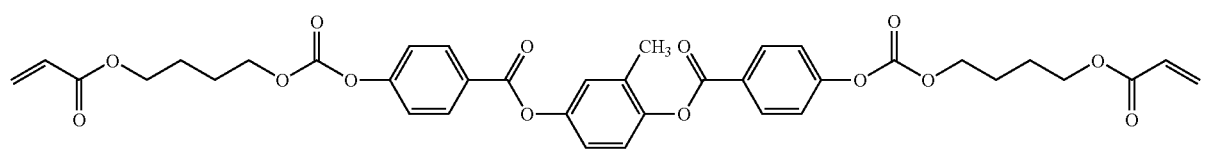

Adjustment of composition B: the following materials (a)-(d) were mixed as the composition B for forming the second layer 102.

(a) Second polymerizable liquid crystal monomer M2: 20 parts by weight of a compound obtained by setting $Y^1$ and $Y^2$ in the following general formula (1) to —COO—, setting $W^1$ and $W^2$ in the general formula (1) to —OCO—, setting p to 4, and setting q to 4

(b) Photopolymerization initiator: 1 part by weight of Irgacure907 which is produced by Ciba Specialty Chemicals and which is represented by the above-described general formula (3)

(c) Surface active agent: 0.02 part by weight of Megafac F-08

(d) Solvent: 78.98 parts by weight of propylene glycol methyl ethyl ether (PGMEA)

seconds to cross-link the second polymerizable liquid crystal monomer M2 in two dimensions, forming the second layer 102.

When the second layer 102 was formed in this way, the film thickness of the second layer 102 in Example 1 was set to 0.5 μm and the film thickness of the second layer 102 in Example 2 was set to 0.3 μm by adjusting the rotational speed of spin coating.

Subsequently, a thermal treatment was performed for 60 minutes within an oven kept in a nitrogen ambient (220° C.; oxygen content of less than 1%). Thus, the three-dimensional cross-linking of the polymerizable liquid crystal monomers in the first layer 101 and second layer 102 was promoted further.

General Formula (1)

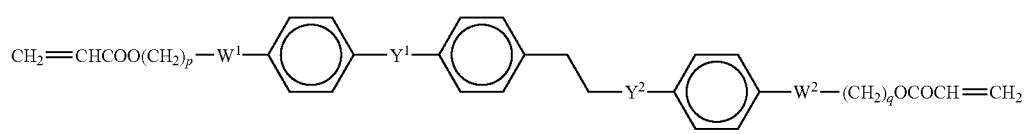

The composition A was spin-coated onto alignment film AL1254 produced by JSR Corporation, Japan, which had been already rubbed, to form a film. Then, the solvent was removed from the film by drying under a reduced pressure at a final degree of vacuum of 0.4 Torr. Then, the film was heated on a hot plate at 80° C. for 1 minute to align the molecules of the liquid crystal material. Thereafter, within an ambient of The viewing-angle dependence of the phase differences of the optical devices (retardation film) of Examples 1 and 2 fabricated in this way was measured. The results are shown in FIG. 5.

Optical devices each having a retardation film were fabricated as Comparative Examples 1-3. The retardation film was made of only the second layer 102 using the second polymerizable liquid crystal monomer M2 that was hybrid-aligned. At this time, the composition B was spin-coated directly onto previously rubbed alignment film AL1254 produced by JSR Corporation, Japan, to form a film. Then, the same procedure as in Examples 1 and 2 was effected. In Comparative Example 1, the second layer 102 having a film thickness of 1.0 μm was formed. In Comparative Example 2, the second layer 102 having a film thickness of 0.6 μm was formed. In Comparative Example 3, the second layer 102 having a film thickness of 0.3 μm was formed.

The viewing-angle dependence of the phase differences of the optical devices (retardation films) of Comparative Examples 1-3 fabricated as described so far was measured. The results are shown also in FIG. 5.

Figure 5:
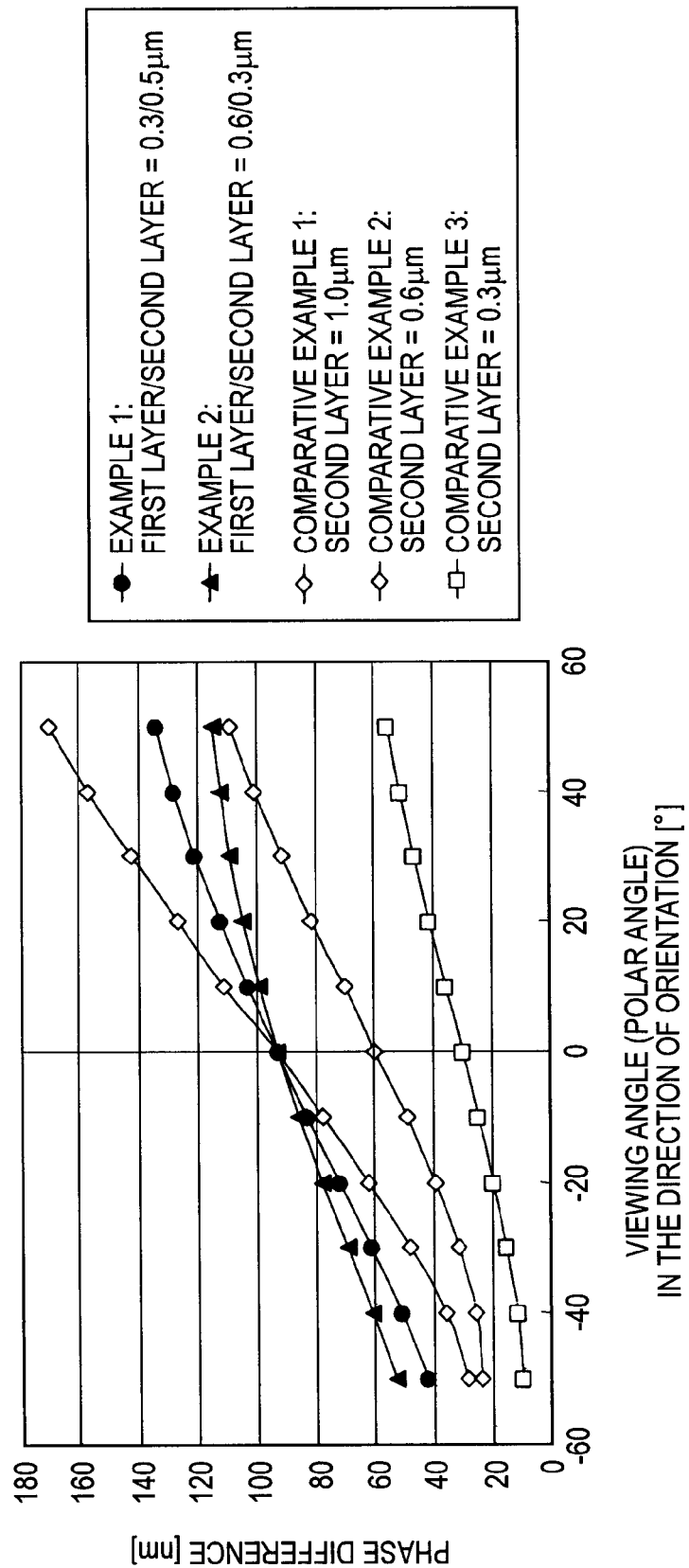
FIG. 5 is a graph illustrating the viewing-angle dependences of phase differences of optical devices of examples 1 and 2 and of comparative examples 1-3.

As is obvious from the graph of FIG. 5, it has been confirmed that in the optical devices of Examples 1 and 2 made of the laminate structure of the first layer 101 and second layer 102, the viewing-angle dependence of the phase difference is controlled by the ratio of their film thicknesses. In the optical device of Comparative Example 1 made only of the second layer 102 having a film thickness substantially equal to the sum of the film thicknesses of Examples 1 and 2, the phase difference measured at the midpoint of the viewing angle (at the front) was identical with the value obtained in Examples 1 and 2. Unlike Comparative Example 1, in Examples 1 and 2, the amounts of variation in the phase difference in the direction of the viewing angle shifted in decreasing directions. Consequently, it has been confirmed that the amount of variation of the phase difference in the direction of the viewing angle can be reduced under given conditions by superimposing the homogeneously aligned first layers 101 at a given film thickness.

In contrast, the results of Comparative Examples 1-3 reveal that where only the film thickness of the second layer 102 that was a retardation film of a hybrid structure was varied, the phase differences, including the phase difference at the front (polar angle of 0°) varied up and down as a whole. It was not possible to control the viewing-angle dependence of the phase difference while the phase difference at the midpoint of the viewing angle (at the front) is kept at a desired value.

Example 3

An optical device of a monolayer structure containing the first polymerizable liquid crystal monomer M1 and second polymerizable liquid crystal monomer M2 at an adjusted ratio was fabricated.

The compositions A and B prepared in Examples 1 and 2 were mixed such that the percentage of the second polymerizable liquid crystal polymer M2 in the polymerizable liquid crystal polymers was 1% to 100% by weight, and each composition C was adjusted.

Each composition C was spin-coated onto alignment film AL1254 produced by JSR Corporation, Japan, which had been already rubbed, to form a film. Then, the solvent was removed from the film by drying under a reduced pressure at a final degree of vacuum of 0.4 Torr. Then, the film was heated on a hot plate at 100° C. for 1 minute to align the molecules of the liquid crystal material. Thereafter, within an ambient of nitrogen having an oxygen content of less than 0.1, the film was exposed with an ultrahigh-pressure vacuum mercury lamp at an illumination of 30 mW/cm$^2$ for an exposure time of 20 seconds to cross-link the polymerizable liquid crystal monomers M1 and M2 in three dimensions.

Then, a thermal treatment was performed for 60 minutes within an oven kept in a nitrogen ambient (220° C.; oxygen content of less than 1%). Thus, the three-dimensional cross-linking of the polymerizable liquid crystal monomers M1 and M2 was promoted further.

In the procedure described so far, the film thickness was varied by adjusting the rotational speed of spin-coating. Optical devices were fabricated such that the retardation value at the front was about 90 to 100 nm.

Optical devices having retardation films were fabricated as described so far. With respect to these elements, the viewing-angle dependence of the phase differences was measured. The results are shown in FIG. 6.

Figure 6:
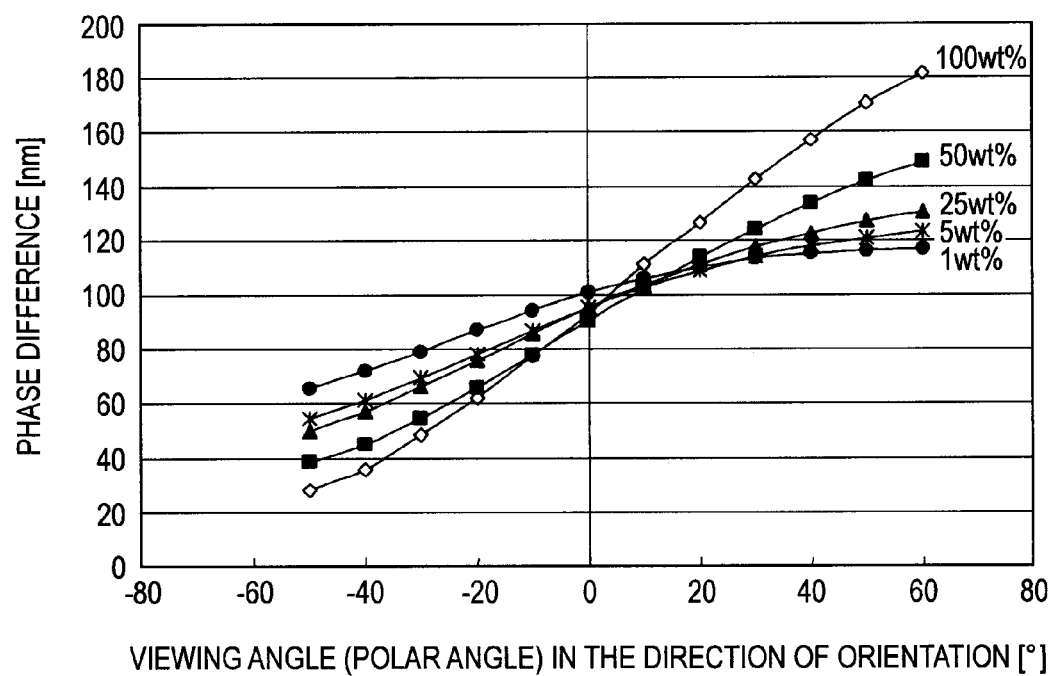
FIG. 6 is a graph illustrating the viewing-angle dependences of the phase differences of optical devices of example 3.

As is obvious from the graph of FIG. 6, it has been confirmed that the viewing-angle dependence of the phase difference can be controlled by adjusting the composition ratio of the first polymerizable liquid crystal monomer M1 aliged at a given angle to the alignment processed surface to the second polymerizable liquid crystal monomer M2 hybrid-aligned relative to the alignment processed surface.

It should be understood by those skilled in the art that various modifications, combinations, sub-combinations and alterations may occur depending on design requirements and other factors insofar as they are within the scope of the appended claims or the equivalents thereof.

What is claimed is:

1. An optical device comprising:
   a polymerizable liquid crystal monomer hybrid-aligned in the optical device; and
   a first polymerizable liquid crystal monomer aligned at a given angle to an alignment processed surface; and
   a second polymerizable liquid crystal monomer hybrid-aligned relative to the alignment processed surface;
   wherein viewing-angle dependence of a phase difference of the optical device is controlled by a ratio of the amount of the first polymerizable liquid crystal monomer to the amount of the second polymerizable liquid crystal monomer.

2. An optical device as set forth in claim 1, wherein the optical device includes a first layer on the aligned film and a second layer formed using the second polymerizable liquid crystal monomer, the first layer being formed using the first polymerizable liquid crystal monomer, and wherein the viewing-angle dependence of the phase difference is controlled by a ratio of the amount of the first polymerizable liquid crystal monomer contained in the first and second layers to the amount of the second polymerizable liquid crystal monomer contained in the first and second layers.

3. An optical device as set forth in claim 2, wherein the ratio of the amount of the contained first polymerizable liquid crystal monomer to the amount of the contained second polymerizable liquid crystal monomer is adjusted by film thicknesses of the first and second layers.

4. An optical device as set forth in claim 2, wherein the first polymerizable liquid crystal monomer is contained in the second layer.

5. An optical device as set forth in claim 1, wherein the first polymerizable liquid crystal monomer is a compound represented by the following structural formula (1):

Structural Formula (1)

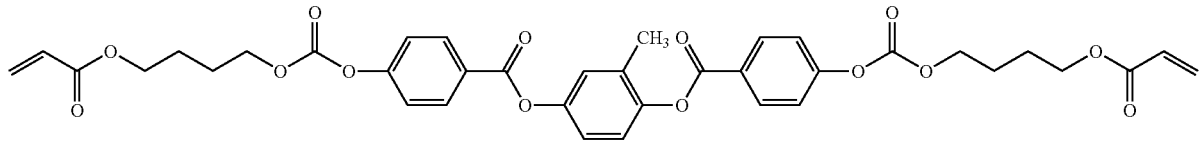

6. An optical device as set forth in claim 1, including a polymerization initiator and a surface active agent together with the first and second polymerizable liquid crystal monomers.

7. An optical device as set forth in claim 1, wherein the first and second polymerizable liquid crystal monomers are mixed in a mixture ratio, and wherein the viewing-angle dependence of the phase difference is controlled by the mixture ratio of the first and second polymerizable liquid crystal monomers.

8. A method of fabricating an optical device, comprising the steps of:
preparing an alignment processed surface;
preparing a solution by dissolving polymerizable liquid crystal monomers in a solvent;
applying the solution to the alignment processed surface to form a film; and
cross-linking molecules of the polymerizable liquid crystal monomers in three dimensions while the molecules of the monomers are hybrid-aligned over the alignment processed surface;
wherein a first polymerizable liquid crystal monomer aligned at a given angle to the alignment processed surface and a second polymerizable liquid crystal monomer hybrid-aligned relative to the alignment processed surface are used as the polymerizable liquid crystal monomers; and
wherein viewing-angle dependence of a phase difference of the optical device is controlled by a ratio of the amount of the contained first polymerizable liquid crystal monomer to the amount of the contained second polymerizable liquid crystal monomer.

9. A method of fabricating an optical device as set forth in claim 8,
wherein a first layer is formed by preparing an alignment processed surface, preparing a solution by dissolving the first polymerizable liquid crystal monomer in a solvent, applying the solution to the alignment processed surface to form a film, and cross-linking molecules of the first polymerizable liquid crystal monomer in three dimensions while the molecules of the first polymerizable liquid crystal monomer are aligned over the alignment processed surface, and
wherein a second layer is formed by preparing a second solution by dissolving the second polymerizable liquid crystal monomer in a solvent, applying the second solution to the first layer to form a film, and cross-linking molecules of the second polymerizable liquid crystal monomer in three dimensions while the molecules of the second polymerizable liquid crystal monomer are hybrid-aligned using the first layer as an alignment film.

10. A method of fabricating an optical device as set forth in claim 8, wherein a solution obtained by dissolving the first and second polymerizable liquid crystal monomers in a solvent is applied to the alignment processed surface to form a film, and wherein molecules of the first and second polymerizable liquid crystal monomers are cross-linked in three dimensions while the molecules of the monomers are aligned over the alignment processed surface.

11. A liquid crystal display comprising
a combination of a liquid crystal cell and a retardation film, the liquid crystal cell having a layer of a liquid crystal material sandwiched between a pair of substrates, the retardation film having polymerizable liquid crystal monomers whose molecules have been hybrid-aligned,
wherein the retardation film is made of a first polymerizable liquid crystal monomer aligned at a given angle to an alignment processed surface and a second polymerizable liquid crystal monomer hybrid-aligned relative to the alignment processed surface, and
wherein viewing-angle dependence of a phase difference is controlled by a ratio of the amount of the contained first polymerizable liquid crystal monomer to the amount of the contained second polymerizable liquid crystal monomer.

12. A liquid crystal display as set forth in claim 11, wherein the liquid crystal cell is operated in electrically controlled birefringence (ECB) mode.

13. A liquid crystal display as set forth in claim 11, wherein the retardation film is a film formed on a surface of the liquid crystal layer of one of the pair of substrates.

14. A liquid crystal display as set forth in claim 13, wherein the retardation film is formed over the one substrate via color filters.

15. A liquid crystal display as set forth in claim 13, wherein the retardation film is formed over the one substrate via a flattened film.

* * * * *